(12) United States Patent
Grieshop et al.

(10) Patent No.: US 10,647,240 B1
(45) Date of Patent: May 12, 2020

(54) SYSTEM AND METHOD FOR CONTROLLING OPERATION OF A DISCHARGE CONVEYOR ON A GRAIN CART

(71) Applicant: J&M Manufacturing Co., Inc., Ft. Recovery, OH (US)

(72) Inventors: Dustan James Grieshop, Fort Recovery, OH (US); Mitchell James Wood, Fort Recovery, OH (US)

(73) Assignee: J&M Manufacturing Co., Inc., Fort Recovery, OH (US)

( * ) Notice: Subject to any disclaimer, the term of this patent is extended or adjusted under 35 U.S.C. 154(b) by 0 days.

(21) Appl. No.: 16/243,175

(22) Filed: Jan. 9, 2019

(51) Int. Cl.
  *B60P 1/42* (2006.01)
(52) U.S. Cl.
  CPC ..................... *B60P 1/42* (2013.01)
(58) Field of Classification Search
  CPC ........................................................ B60P 1/42
  See application file for complete search history.

(56) References Cited

U.S. PATENT DOCUMENTS

| | | | | |
|---|---|---|---|---|
| 4,923,358 A | * | 5/1990 | Van Mill | B60P 1/42 198/532 |
| 10,292,327 B2 | * | 5/2019 | Ducroquet | A01D 41/1217 |
| 10,377,290 B2 | * | 8/2019 | Stilborn | A01D 90/10 |
| 10,390,489 B2 | * | 8/2019 | Winsnes | B60S 1/66 |
| 10,426,092 B2 | * | 10/2019 | Van Mill | B60P 1/42 |
| 2011/0164952 A1 | * | 7/2011 | Hollenberg | B60P 1/42 414/523 |
| 2011/0220677 A1 | * | 9/2011 | Bertolani | B60P 1/42 222/1 |
| 2014/0365170 A1 | * | 12/2014 | Van Mill | B60P 1/42 702/173 |
| 2019/0218045 A1 | * | 7/2019 | Thomson | A01D 41/1217 |
| 2019/0322461 A1 | * | 10/2019 | Banthia | A01D 90/10 |

\* cited by examiner

*Primary Examiner* — Kaitlin S Joerger
(74) *Attorney, Agent, or Firm* — Wood Herron & Evans LLP

(57) ABSTRACT

A grain cart includes a lower auger conveyor section and an upper auger conveyor section pivotally movable relative to the lower auger conveyor section between a first position and a second position. The lower auger conveyor section further includes an auger feed gate movable between a closed position and an open position. The grain cart further includes a movement actuator adapted to move the upper auger conveyor section between the first position and the second position. The grain also includes a control system including an auger feed gate position sensor operatively coupled to the movement actuator and functioning to control the movement actuator based on input from the auger feed gate position sensor to provide a lock out function preventing the movement actuator from moving the upper auger conveyor section towards the first position only when the auger feed gate is in the open position.

21 Claims, 7 Drawing Sheets

SYSTEM AND METHOD FOR CONTROLLING OPERATION OF A DISCHARGE CONVEYOR ON A GRAIN CART

TECHNICAL FIELD

The invention relates generally to grain carts, and more particularly, a control system for operating a discharge conveyor on the grain cart.

BACKGROUND

Grain carts are typically used to transport harvested grain from the field to a truck waiting alongside the field. An empty grain cart pulls alongside a moving combine and an offload auger conveys the grain in the combine to the hopper of grain cart. When hopper of the grain cart is full, the grain cart pulled by a tractor is moved to alongside the hopper trailer of a truck alongside the edge of the field, typically on a roadside. The typical grain cart will have a discharge conveyor with a two-part auger housing, where the upper auger housing is moveable between a storage position (also sometimes referred to as a field position) and an unload position. While moving the grain cart from the combine to the hopper trailer, the upper auger housing will typically be in the storage position, i.e., disengaged from the lower auger housing and folded in front of the grain cart. Upon reaching the side of the hopper trailer, the tractor operator will move the upper auger housing from the storage position to the unload position such that the lower auger housing and the upper auger housing are aligned to form a continuous auger housing. The discharge end of the upper auger housing will be positioned overtop of the hopper trailer to offload the hopper of the grain cart to the hopper trailer.

The inlet or feed end of the lower auger housing is positioned within the hopper of the grain cart. The inlet end includes a moveable auger feed gate that opens and closes the inlet end. When the auger feed gate is open, grain from the hopper of the grain cart may enter the inlet end and be carried through the continuous auger housing when the auger is rotating. During the offloading process, the grain cart operator may want to shut the auger feed gate to stop the flow of grain through the auger housings, such as when the hopper trailer becomes full. The auger typically continues to rotate while the gate is being closed and/or for a short time period after closing the gate so the discharge conveyor can be cleared of any remaining grain.

It is not uncommon for the operator of the grain cart, however, to inadvertently activate the lever that controls the upper auger housing causing the upper auger housing to start folding toward the storage position and separating from the lower auger housing. Because the auger is still rotating and grain remains in the lower auger housing, grain begins to discharge out of the top of the lower auger housing which is no longer aligned with the now moving and disengaged upper auger housing. When the operator recognizes the mistake, the usual reaction is to quickly reverse the lever to force the upper auger housing back into the unload position. When reversing the direction of the upper auger housing, the stopped upper auger may slam into the rotating lower auger. Consequently, the lower auger, upper auger, upper auger housing, springs, and bearings can sustain enough damage that downtime and repairs will be necessary. This downtime and repairs may significantly slow down or stop the harvesting operation. Moreover, moving the upper auger housing into the unload position while grain is flowing from the top end of the lower auger housing can cause grain to occlude or otherwise block proper engagement of the upper and lower auger housings when the operator performs such a movement back towards the unload position.

The drive line and auger system may also be damaged if the auger is engaged, i.e., commanded to rotate, with the auger feed gate open and the hopper of the grain cart contains a substantial amount of grain. Under these circumstances, the lower auger is exposed to the load pressure of the grain in the hopper which may cause extensive damage to the drive line and auger system. It is best practice to empty the augers by having the auger feed gate closed while running the augers a sufficient time to empty the auger housings. It is also best practice to fold the upper auger housing to a storage position before transport to prevent damage to the upper auger housing and surroundings.

What is needed is a control system to protect the auger system from being damaged during certain operational events of the grain cart. To this end, it would be desirable to prevent accidental movements of the discharge conveyor out of the unload position when the discharge conveyor is full of or transporting grain.

SUMMARY OF THE INVENTION

The present invention is directed to a grain cart with a control system which provides desirable features and advantageous and overcomes deficiencies of prior grain carts. In accordance with the illustrated embodiment of the invention, a grain cart includes a grain hopper and a discharge conveyor extending into the grain hopper and having a lower auger conveyor section and an upper auger conveyor section pivotally movable relative to the lower auger conveyor section between a first position in which the upper auger conveyor section is disengaged from the lower auger conveyor section and a second position in which the upper auger conveyor section is aligned with and engaged with the lower auger conveyor section. The lower auger conveyor section further includes an auger feed gate movable between a closed position and an open position. The grain cart also includes a movement actuator adapted to move the upper auger conveyor section between the first position and the second position. The grain cart also includes a control system including an auger feed gate position sensor operatively coupled to the movement actuator and functioning to control the movement actuator based on input from the auger feed gate position sensor so as to provide a lock out function that prevents the movement actuator from moving the upper auger conveyor section towards the first position only when the auger feed gate is in the open position. In one aspect of this embodiment, the first position is a storage position of the discharge conveyor and the second position is an unload position of the discharge conveyor.

In one aspect of this embodiment, the grain cart further includes an indicator rod connected to the auger feed gate and extending out of the grain hopper such that a tip end of the indicator rod is visible to an operator outside the grain cart. The indicator rod is connected so as to move with the auger feed gate and thereby provide a visual indication of the position of the auger feed gate based on where the tip end is located. In another aspect, that indicator rod carries at least one element configured to operatively interact with the auger feed gate position sensor such that the auger feed gate position sensor can determine when the auger feed gate is in the closed position or the open position. In yet another aspect, the auger feed gate position sensor is a normally-closed push-button switch, and the at least one element carried by the indicator rod includes a switch trigger configured to engage the push-button switch to open the push-button switch when the indicator rod and the auger feed gate are moved to the closed position. In still another aspect, the switch trigger is slideably mounted on the indicator rod and is biased towards the push-button switch by a compression spring extending between the switch trigger and a clamp rigidly coupled for movement with the indicator rod.

In one aspect of this embodiment, the control system includes a control valve, which includes a solenoid operatively connected to the auger feed gate position sensor. The solenoid is configured to be energized when the auger feed gate is in the open position. In another aspect, the control valve has a two-way channel and a check valve. The two-way channel is operative when the auger feed gate is in the closed position whereas the check valve is operative when the auger feed gate is in the open position based on selective energizing of the solenoid. In yet another aspect, the movement actuator is a hydraulic cylinder and the check valve of the control valve prevents outgoing flow from one side of the hydraulic cylinder when the auger feed gate is in the open position, thereby preventing movement of the hydraulic cylinder in one direction corresponding to movement of the upper auger conveyor section towards the first position.

In one embodiment, the grain cart further includes a visual indicator in the form of a light-emitting diode that is actuated when the auger feed gate position sensor determines that the auger feed gate is in the open position to provide a visual indication to an operator outside the grain cart when the lock out function is operating to prevent movement of the upper auger conveyor section towards the first position. This embodiment may include an indicator rod connected to the auger feed gate and extending out of the grain hopper such that a tip end of the indicator rod is visible to an operator outside the grain cart and the tip end provides another visual indication of the position of the auger feed gate based on where the tip end is located, such that the grain cart provides multiple visual indications of when the lock out function is active.

The lock out function of the control system does not prevent the movement actuator from moving the upper auger conveyor section towards the second position when the auger feed gate is in the open position and the movement actuator is free to move the upper auger conveyor section in either direction when the auger feed gate is in the closed position and the lock out function is not active.

In one embodiment, the upper and lower auger conveyor sections include an auger therein for moving grain through the discharge conveyor and the lock out function is used to assure the auger runs to clear the discharge conveyor from grain before the upper auger conveyor section is moved from the second position towards the first position. In one aspect, the auger feed gate position sensor is also operatively coupled to an actuator for the auger such that the auger cannot initiate rotation unless the auger feed gate is in the closed position, to thereby avoid damaging the auger and/or the actuator by starting rotation while under load from grain entering through the auger feed gate from the grain hopper.

The invention also contemplates a method for controlling a grain cart that includes a grain hopper and a discharge conveyor with an upper auger conveyor section and a lower auger conveyor section pivotally movable relative to one another. In one embodiment, the method employs various steps, including moving, by a movement actuator, the upper auger conveyor section from a first position in which the upper auger conveyor section is disengage from the lower auger conveyor section to a second position in which the upper auger conveyor section is aligned with and engaged with the lower auger conveyor section; operating an auger located in the upper and lower auger conveyor sections while the upper auger conveyor section is in the second position to transport grain from the grain hopper through the discharge conveyor; moving an auger feed gate located at the lower auger conveyor section between an open position and a closed position, to thereby control flow of grain from the grain hopper into the discharge conveyor; sensing, by an auger feed gate position sensor, whether the auger feed gate is in the open position or the closed position; and disabling with a lock out function the movement actuator from moving the upper auger conveyor section towards the first position only when the auger feed gate is in the open position, as determined by the auger feed gate position sensor.

In one aspect of this method, the movement actuator is a hydraulic cylinder, and the step of disabling with a lock out function further includes actuating a solenoid to selectively prevent outgoing flow from one side of the hydraulic cylinder when the auger feed gate is in the open position. In another aspect, the auger feed gate position sensor is connected to the solenoid within a control valve, which includes a two-way channel and a check valve, and the step of actuating the solenoid further includes placing, by the solenoid, the two-way channel into communication with the hydraulic cylinder to allow flow in both directions and thereby allow the movement actuator to move the upper auger conveyor section in either direction when the auger feed gate position sensor determines that the auger feed gate is in the closed position; and placing, by the solenoid, the check valve into communication with the hydraulic cylinder to allow flow in only one direction and thereby allow the movement actuator to move the upper auger conveyor section only towards the second position when the auger feed gate position sensor determines that the auger feed gate is in the open position.

In one embodiment, the auger feed gate position sensor is a normally-closed push-button switch and the grain cart further includes an indicator rod connected to the auger feed gate such that a tip end of the indicator rod is visible to an operator outside the grain cart. The indicator rod carries a switch trigger, and the method further includes moving the indicator rod with movements of the auger feed gate such that the tip end extends further out of the grain hopper when the auger feed gate moves to the open position, thereby providing a visual indication of the position of the auger feed gate to the operator; and moving, by the indicator rod, the switch trigger into engagement with the push-button switch to deactivate the lock out function when the auger feed gate moves to the closed position.

In one aspect, the grain cart further includes a visual indicator in the form of a light-emitting diode that is visible to an operator outside the grain cart and is operatively connected to the auger feed gate position sensor, and the method further includes actuating the light-emitting diode to provide a visual indication to the operator when the lock out function is active according to signals from the auger feed gate position sensor.

In the method, the lock out function does not prevent the movement actuator from moving the upper auger conveyor section towards the second position when the auger feed gate is in the open position, and the movement actuator is free to move the upper auger conveyor section in either direction when the auger feed gate is in the closed position and the lock out function is not active.

In another aspect, the method further includes preventing a start of rotation of the auger when the auger feed gate is in the open position, to thereby avoid damaging the auger and/or the actuator by starting rotation while under load from grain entering through the auger feed gate from the grain hopper.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION OF THE INVENTION

Figure 1:
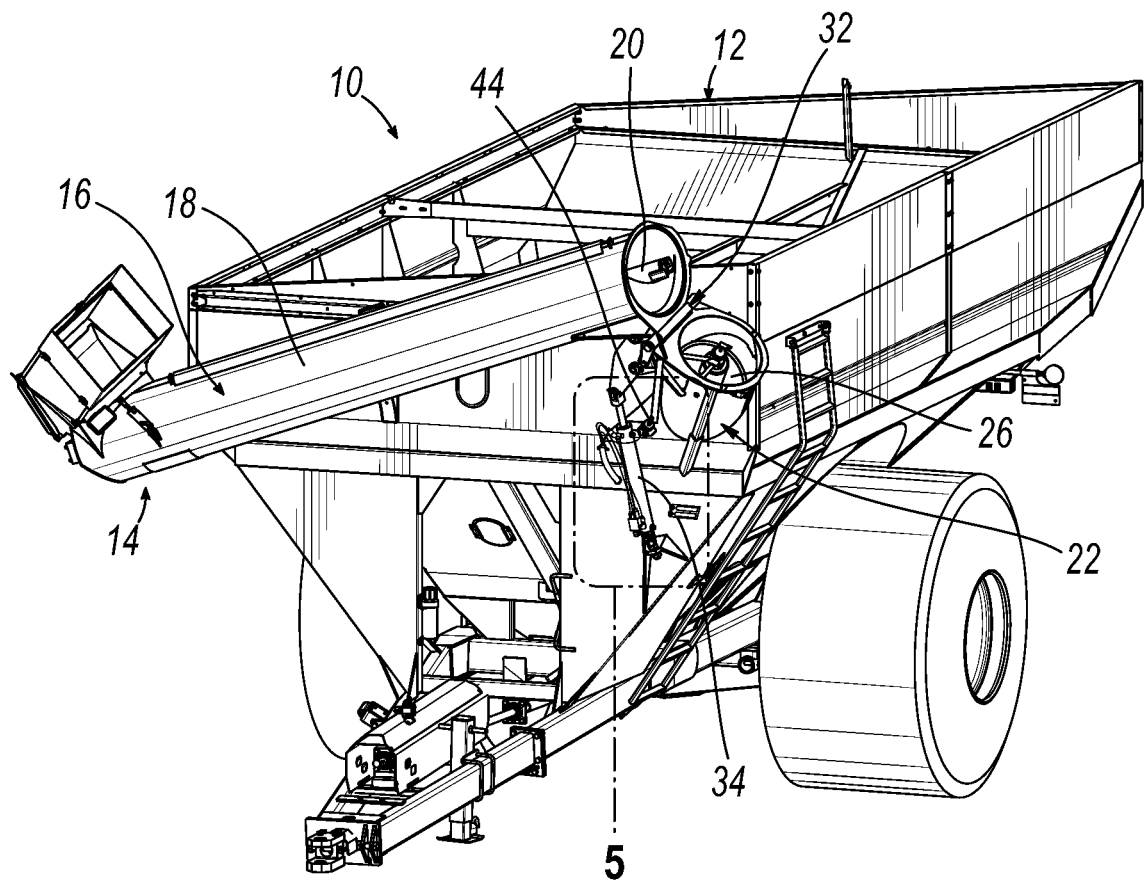
FIG. 1 is a perspective view of a grain cart with an upper auger conveyor section in the storage position.
Figure 2:
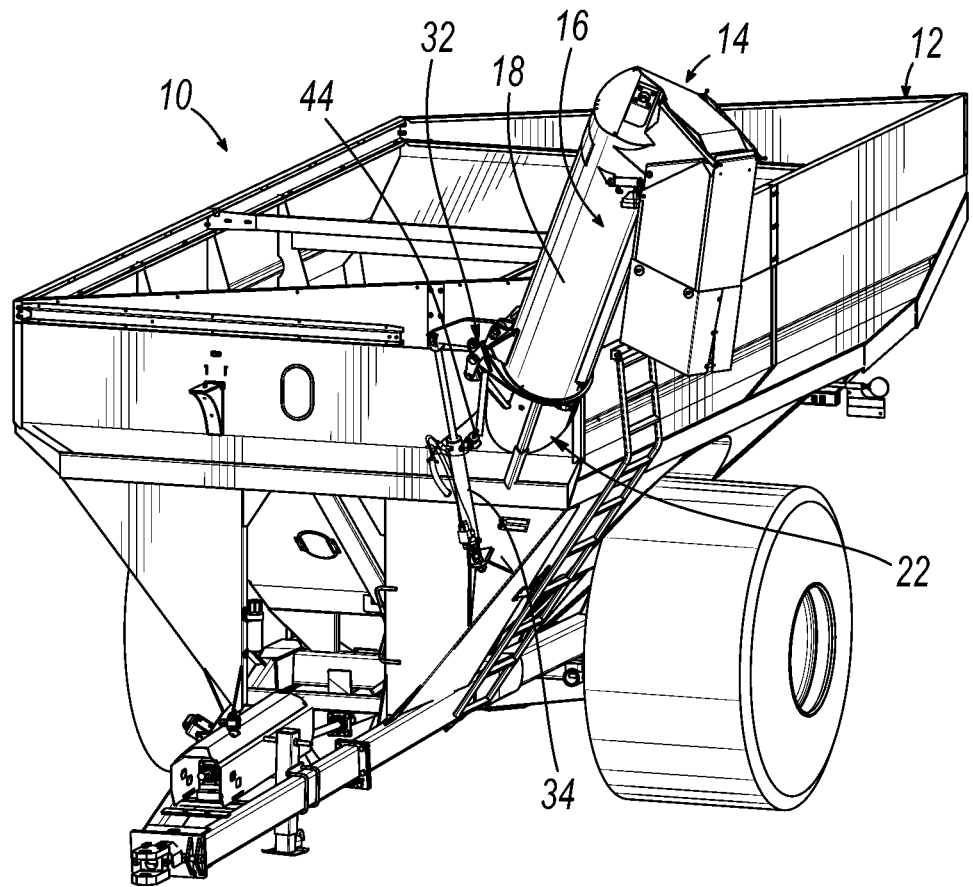
FIG. 2 is a perspective view of the grain cart of FIG. 1 with the upper auger conveyor section in the unload position.
Figure 3:
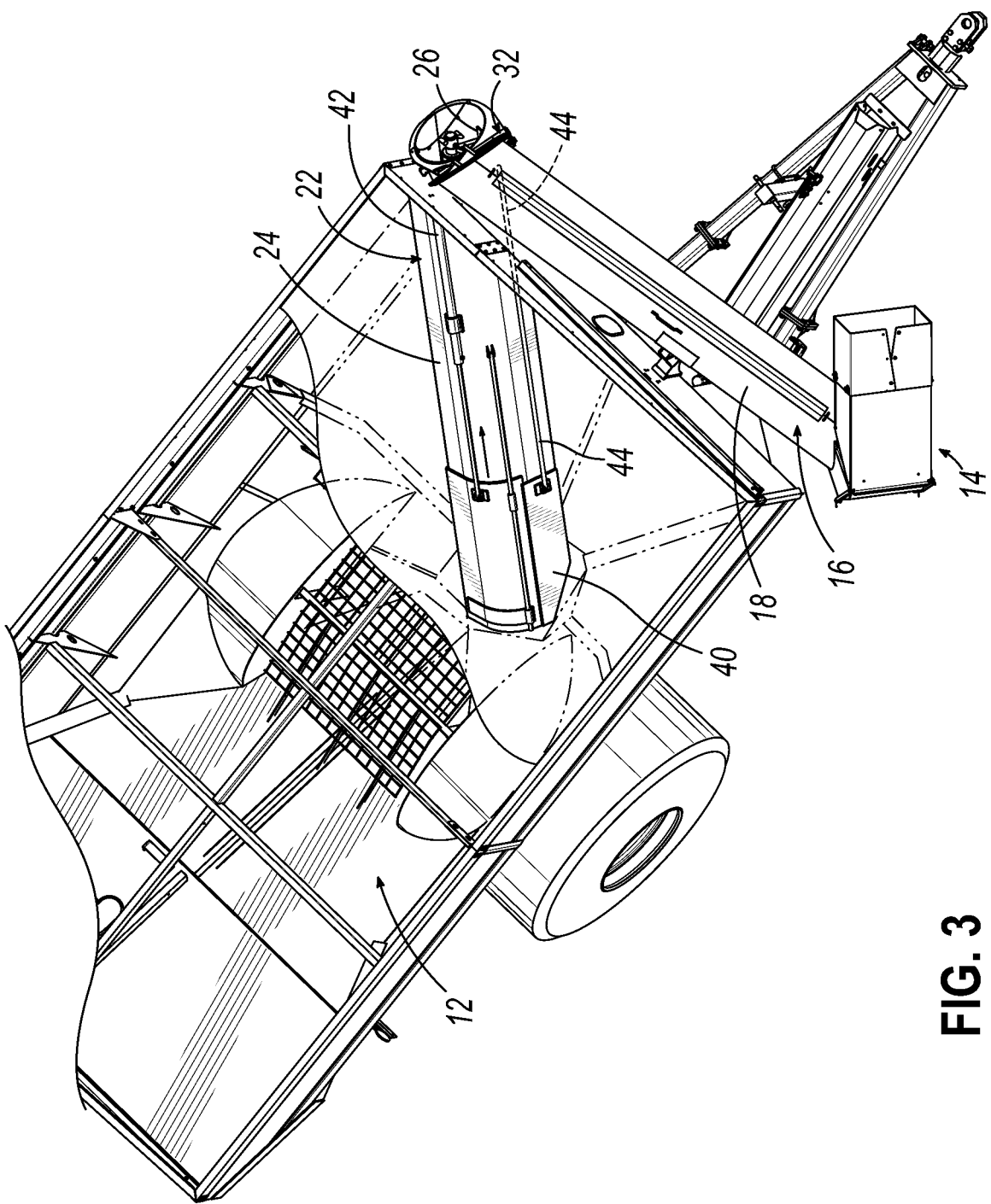
FIG. 3 is a fragmentary perspective view of the grain cart of FIG. 1 looking down into a grain hopper with an auger feed gate in a closed position.

FIGS. 1 and 2 illustrate a grain wagon or cart 10 which has a general construction similar to the grain cart disclosed in U.S. Pat. No. 7,143,830, the disclosure of which is herein incorporated by reference. The grain cart 10 includes a grain hopper 12 and a discharge conveyor 14. The discharge conveyor 14 is shown in a storage position in FIG. 1 and in an unload position in FIG. 2. The discharge conveyor 14 includes an upper auger conveyor section 16 with a tubular housing 18, which includes an upper auger 20. As shown in FIGS. 1 and 3, the discharge conveyor 14 also includes a lower auger conveyor section 22 with a tubular housing 24, which includes a lower auger 26.

The upper auger conveyor section 16 is pivotally attached to the lower auger conveyor section 22 via a hinge assembly 32. A movement actuator, such as a fluid or hydraulic cylinder 34 is operatively connected to the upper auger conveyor section 16 and is adapted to move the upper auger conveyor section 16 between a first position corresponding to the storage position of the discharge conveyor 14 (FIG. 1) and a second position corresponding to the unload position of the discharge conveyor 14 (FIG. 2). It will be understood that the upper auger conveyor section 16 may be rotated further than the storage position shown in FIG. 1 such that the discharge end of the upper auger conveyor section 16 is closer to the ground (in further storage or transport positions). The hydraulic cylinder 34 is controlled by a control, e.g., lever, switch, knob, etc. (not shown), located on the grain cart 10 or on a tractor (not shown) which may be connected to the grain cart 10 to pull it. It will be understood that other types of known movement actuators (electric, mechanical, and otherwise) may be used for the movement actuator in other embodiments consistent with the scope of this invention.

Figure 4:
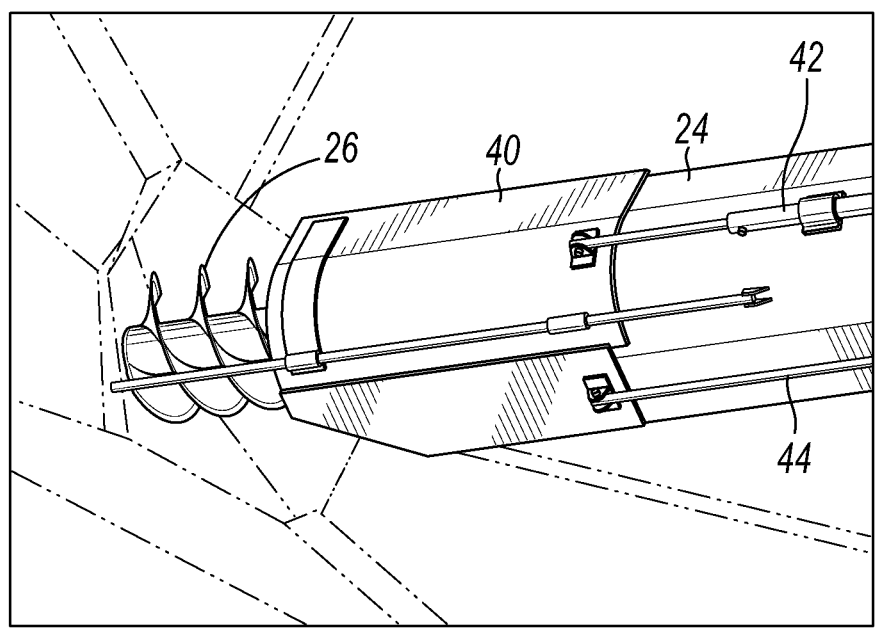
FIG. 4 is a detailed perspective view of the grain cart of FIG. 3 showing the auger feed gate in an open position.

FIG. 3 illustrates the interior of the grain hopper 12 and the lower auger conveyor section 22, which extends into the interior of the grain hopper 12. The lower auger conveyor section 22 includes a slideably movable auger feed gate 40 operatively connected to a fluid or hydraulic cylinder 42 which is adapted to move the auger feed gate 40 between a closed position (FIG. 3) and an open position (FIG. 4). In the open position, grain can flow into the bottom end of lower auger 26 for transport through the discharge conveyor 14. An indicator rod 44 is affixed to the top of the auger feed gate 40. The indicator rod 44 runs parallel to the lower tubular housing 24 and terminates at a tip end 45 outside the grain hopper 12 near the hinge assembly 32. In this embodiment, the indicator rod 44 moves in one-to-one correspondence with the auger feed gate 40. That is, for every inch the auger feed gate 40 moves, the indicator rod 44 also moves an inch. The hydraulic cylinder 42 may be controlled by a control, e.g., lever, switch, knob, etc. (not shown), located on the grain cart 10 or on a tractor (not shown) which may be connected to the grain cart 10 to pull it.

In accordance with one aspect of the invention, the grain cart 10 includes a control system 50 generally shown in FIGS. 5-7B. In general, the control system 50 prevents the upper auger conveyor section 16 from moving towards the storage position when the auger feed gate 40 is an open position. In other words, the control system 50 provides a "lock-out feature" for upper auger conveyor section 16. For example, if the upper auger conveyor section 16 is in the unload position (FIG. 2) and the auger feed gate 40 is in an open position (FIG. 4), the control system 50 will prevent the upper auger conveyor section 16 from pivoting away from the lower auger conveyor section 22 and moving towards the storage position (FIG. 1). The control system 50, however, permits the upper auger conveyor section 16 to move from the storage position towards the unload position regardless of the position (open or closed) of the auger feed gate 40. The components and operation of the control system 50 will be described in more details in reference to FIGS. 5-7B.

Figure 5:
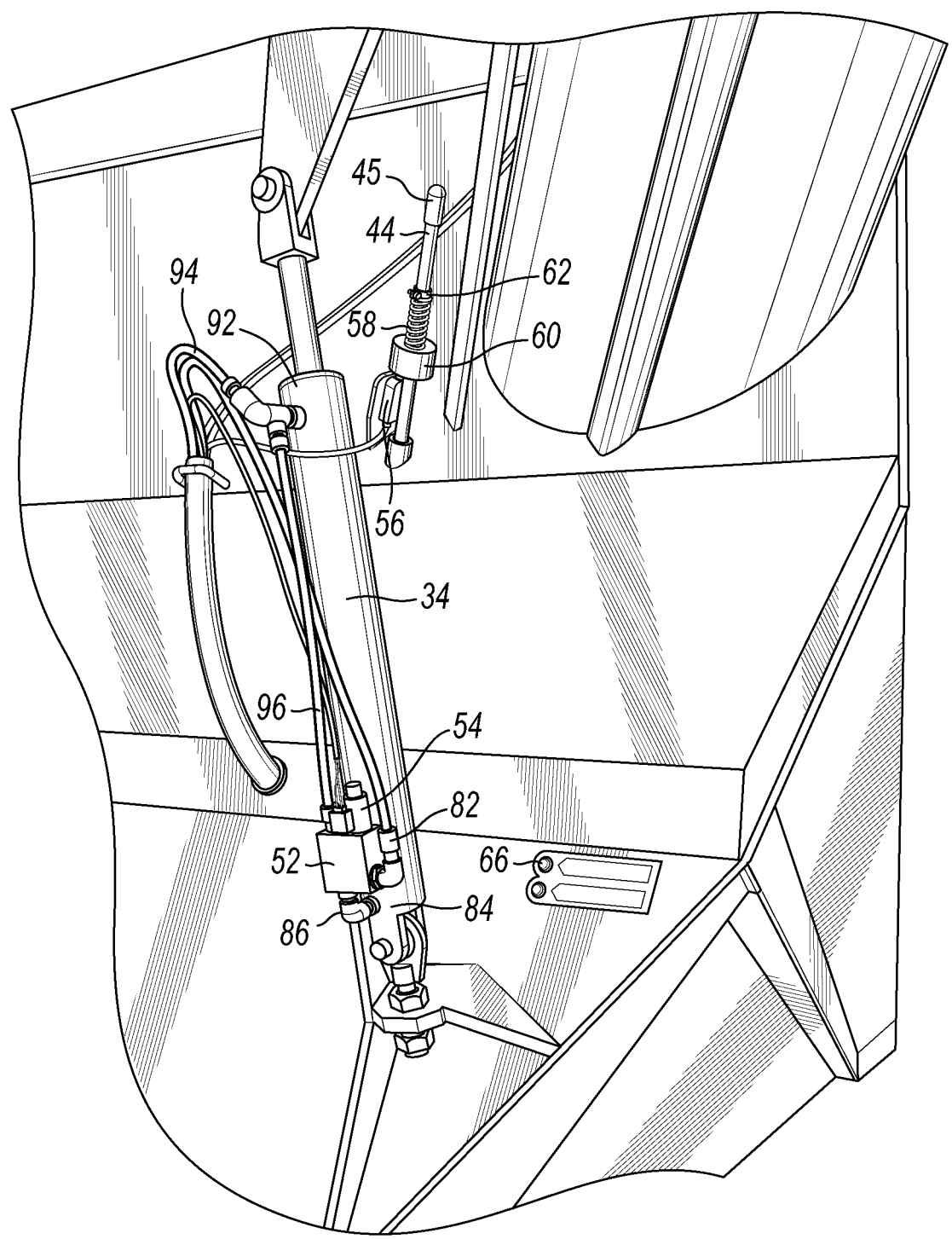
FIG. 5 is an expanded view of Detail 5 of FIG. 1 showing the cylinder control valve, push-button switch, and indicator rod.
Figure 6A:
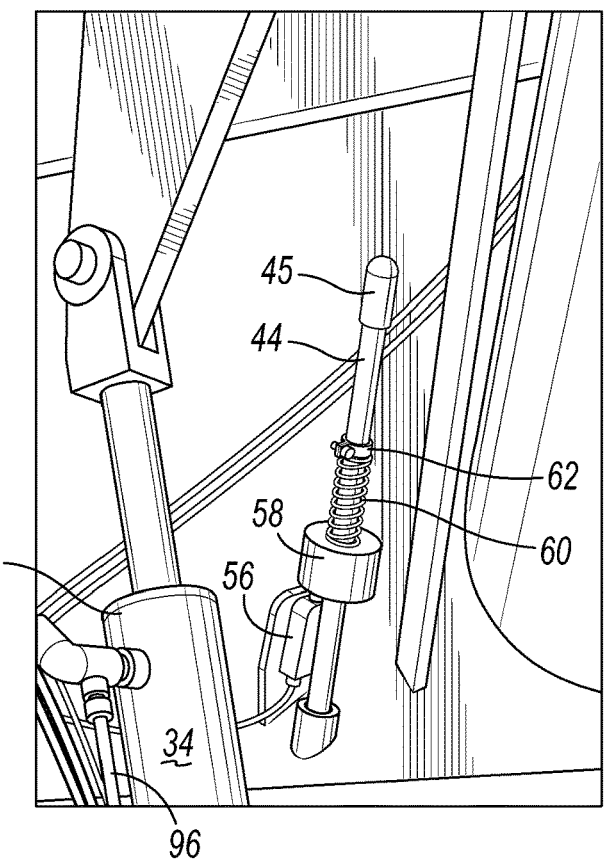
FIG. 6A is an expanded view of Detail 5 of FIG. 5 with the indicator rod indicating the auger feed gate is closed.
Figure 6B:
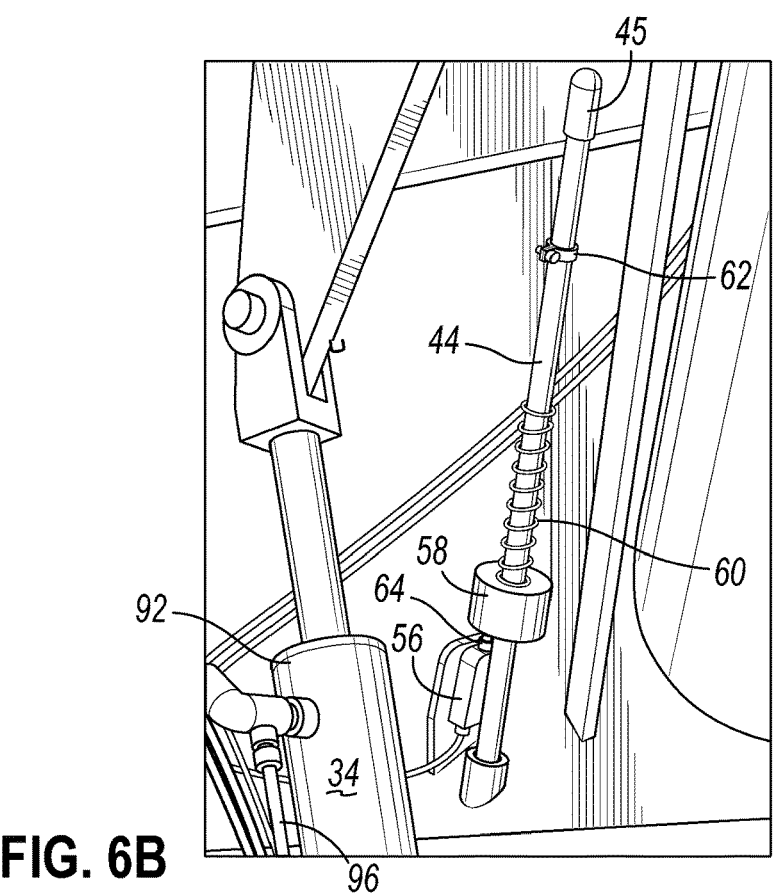
FIG. 6B is an expanded view of Detail 5 of FIG. 5 with the indicator rod indicating the auger feed gate is opened.

The control system 50 includes a cylinder control valve 52 which is affixed to the hydraulic cylinder 34 as shown in FIG. 5. The cylinder control valve 52 includes a solenoid 54 electrically coupled to an auger feed gate position sensor 56. In the embodiment shown in the FIGS. 5-7B, the auger feed gate position sensor 56 is a normally-closed push-button switch. As will be explained in more detail below, when the auger feed gate 40 is in the closed position, the normally-closed push-button switch 56 is open, i.e., engaged, such that the solenoid 54 is not energized. When the auger feed gate 40 is in an open position (any position but closed), the normally-closed push-button switch 56 is closed, i.e., disengaged, such that the solenoid 54 is energized. It should be appreciated that other types of auger feed position sensors may be used to monitor the position of the auger feed gate 40. For example, a Hall effect proximity sensor may be used in alternative embodiments in conjunction with one or more magnetic indicator elements carried on the indicator rod 44 to monitor the position of the auger feed gate 40. In short, the auger feed gate position sensor 56 is not limited to the example structure shown in the illustrated embodiment, so long as the auger feed gate position sensor 56 provides accurate indications and actuations when the auger feed gate 40 opens from a closed position.

The indicator rod 44 of the illustrated embodiment includes an element such as a switch trigger 58, a spring 60, and a clamp 62 affixed to the indicator rod 44. The switch trigger 58, which may be made of plastic such as HMW polyethylene, is slideably mounted on the indicator rod 44 and, therefore, does not move with the indicator rod 44 as the indicator rod 44 moves with the auger feed gate 40 as the latter moves between open and closed positions. When the auger feed gate 40 moves from an open position and approaches the closed position, the indicator rod 44 and the clamp 62 affixed to the indicator rod 44 move downward and the clamp 62 begins to engage and compress the spring 60 as the auger feed gate 40 continues to move. When the auger feed gate 40 reaches the closed position (FIG. 3), the compressed spring 60 forces the switch trigger 58 onto and into engagement with a push button 64 (FIG. 6B) of the switch trigger 58, causing the normally-closed push-button switch 56 to become open, which de-energizes the solenoid 54. This configuration, where the auger feed gate 40 is closed, the normally-closed push-button switch 56 is open, and the solenoid 54 is de-energized is shown schematically in FIG. 7A.

When the auger feed gate 40 moves from the closed position to an open position, the indicator rod 44 and the clamp 62 move upward and the clamp 62 begins to move away from the switch trigger 58, which will begin to decompress the compressed spring 60. As the compression force on the spring 60 decreases, the bias force of the push button 64 eventually pushes the switch trigger 58 away and the normally-closed push-button switch 56 returns to its normally-closed position, which energizes the solenoid 54. This configuration, where the auger feed gate 40 is open, the normally-closed push-button switch 56 is closed, and the solenoid 54 is energized as shown schematically in FIG. 7B. When the normally-closed push-button switch 56 is closed, i.e., the auger feed gate 40 is in an open position, a visual indicator 66, such as an LED light, illuminates to signify that the upper auger conveyor section 16 cannot be moved towards the storage position. This visual indicator 66 is preferably located on the front of the grain cart 10 as shown in FIG. 5 so that the tractor operator can see that the "lock-out feature" is engaged. This visual indication is advantageously in addition to another visual indication provided by the position of the tip end 45 of the indicator rod 44 relative to the hinge assembly 32 joint between the upper and lower auger conveyor sections 16, 22. For example, the tip end 45 may be painted or otherwise made of a bright, contrasting color to the color of the grain cart 10, to thereby make it easier for an operator to see the indicator rod 44 and thus know the corresponding open or closed position of the auger feed gate 40. By having multiple visual indicators on the grain cart 10, operators are more likely to avoid mistakes in operation as described in the Background section of this disclosure.

Figure 7A:
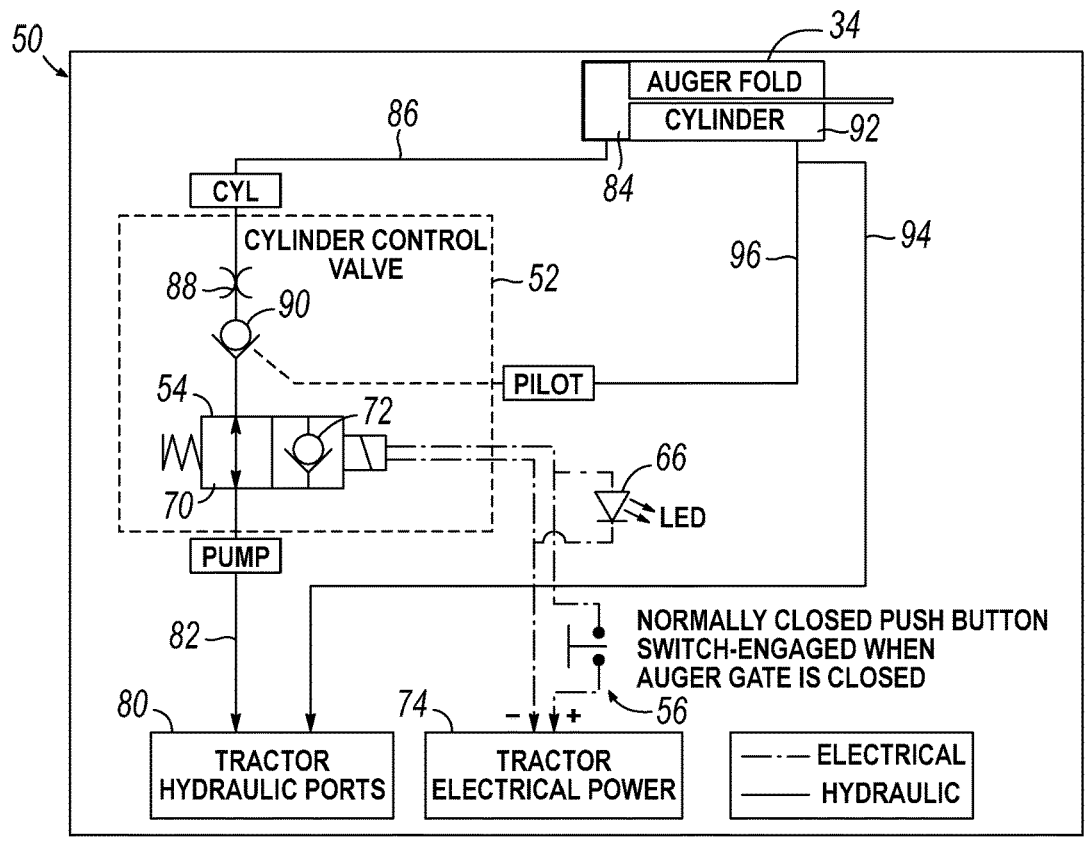
FIG. 7A is schematic of a control system with the auger feed gate being in a closed position.
Figure 7B:
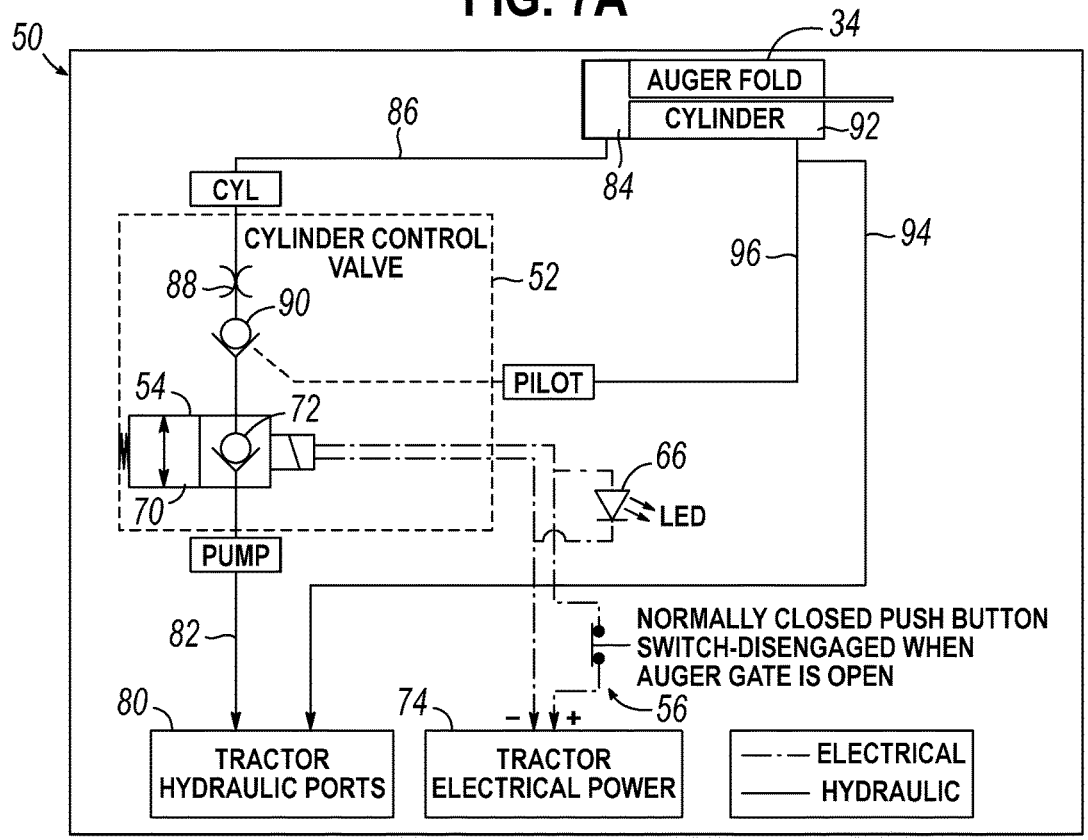
FIG. 7B is schematic of the control system of FIG. 7A with the auger feed gate in an open position.

With further reference to FIGS. 7A and 7B, the solenoid 54 has two operative positions. In the first position, a two-way channel/passageway 70 is operative. In the second position, a check valve 72 is operative. As shown in FIGS. 7A and 7B, the solenoid 54 is electrically coupled to the normally-closed push-button switch 56 and the tractor electrical power 74 when a tractor (not shown) is operatively coupled to the grain cart 10. When the solenoid 54 is energized, i.e., the normally-closed push-button switch 56 is closed, the check valve 72 is operative. In contrast, when the solenoid 54 is de-energized, i.e., the normally-closed push-button switch 56 is open, the two-way channel 70 is operative. The visual indicator 66 is also powered by the tractor electrical power 74 based on the position of the normally-closed push-button switch 56.

The cylinder control valve 52 is connected to one of the tractor hydraulic ports 80 via line 82 when a tractor (not shown) is operatively coupled to the grain cart 10. Line 82 is connected to pump side of the solenoid 54. The cylinder control valve 52 is also connected to a base end 84 of the hydraulic cylinder 34 via line 86. To this end, line 86 is connected to the cylinder side of the solenoid 54. Inside the cylinder control valve 52 of this embodiment, line 86 includes an orifice 88 and a pilot-operated check valve 90. A piston end 92 of the hydraulic cylinder 34 is connected to another of the tractor hydraulic ports 80 via line 94. The cylinder control valve 52 is also connected to the piston end 92 via pilot line 96 which is also connected to the pilot-operated check valve 90.

The typical situation where the "lock-out feature" will be advantageous is when the grain cart 10 is being unloaded into a hopper trailer of truck parked alongside the edge of a field. While unloading the grain cart 10, the auger feed gate 40 will be in an open position (FIG. 4) and the indicator rod 44 will be raised up allowing the switch trigger 58 to disengage the push button 64 of the normally-closed push-button switch 56. In addition, the upper auger conveyor section 16 will be in the unload position and thereby aligned with lower auger conveyor section 22 and both the upper auger 20 and lower auger 26 will be rotating to move the grain from the grain hopper 12 and through the discharge conveyor 14. With the normally-closed push-button switch 56 disengaged, i.e., closed, the solenoid 54 is energized and the check valve 72 is in the operative position (FIG. 7B) to prevent flow from the base end of the hydraulic cylinder 34 to one of the hydraulic ports 80. Consequently, the "lock out function" is enabled. In this "lock-out" condition, the tractor operator cannot command the upper auger conveyor section 16 to move from the unload position to the storage position because flow of hydraulic fluid out of the base end of the hydraulic cylinder 34 is blocked by the check valve 72, such flow being necessary to enable movement of the hydraulic cylinder 34 between positions moving towards the storage position. Advantageously, this configuration prevents the tractor operator from inadvertently moving the upper auger conveyor section 16 from the unload position to the storage position while the discharge conveyor 14 contains grain as it unloads the grain from the grain cart 10. This lock out function prevents grain spillage at the hinge assembly 32 between the upper and lower auger conveyor sections 16, 22 and avoids having the upper auger conveyor section 16 moved towards a folded or storage position while full of grain (the heavier weight when filled with grain may cause damage to the movement actuator, for example). If the tractor operator, closes the auger feed gate 40, then the switch trigger 58 will engage the push button 64 which will open the normally-closed push-button switch 56, thereby de-energizing the solenoid 54 such that the two-way channel is in the operative position. Consequently, the "lock-out feature" is disabled and the upper auger conveyor section 16 may be moved from the unloading position to the storage position.

The "lock-out feature" does not prevent the upper auger conveyor section 16 from moving from the storage position to the unload position even when the auger feed gate 40 is in an open position, the solenoid 54 is energized, and the check valve 72 is in the operative position. To this end, if grain can flow past the auger feed gate 40 and into the discharge conveyor 14 (or even if not), the control system 50 of this invention does not block movement of the upper auger conveyor section 16 towards the unload position, as the problem of spilling grain moving through the discharge conveyor 14 is not exacerbated by allowing movement towards the unload position. Thus, the control system 50 of the embodiments described herein provides a selective lock out of only one type of movement of the discharge conveyor 14 to help avoid some of the most problematic accidents and errors that may occur when operating the grain cart 10.

In another aspect of the present invention, the auger formed by the upper and lower augers 20, 26 is operatively coupled to the push-button switch 56 to provide additional functionality. To this end, the actuator (not shown) for the auger receives signal from the push-button switch 56 to evaluate whether the auger feed gate 40 is in the open position or the closed position. Only if the push-button switch 56 indicates that the auger feed gate 40 is in the closed position will the auger be able to start rotating to move grain through the discharge conveyor 14. This arrangement avoids having the auger begin rotating when under a full load of grain entering from the grain hopper 12 past the auger feed gate 40, which could damage the auger or its actuator. Likewise, as set forth above, the lock out function prevents folding of the upper auger conveyor section 16 until after the auger feed gate 40 is closed, which assures that the auger will continue to rotate to empty the discharge conveyor 14 of grain before the auger is stopped. These features in combination advantageously avoid having the auger start rotation under full load in this embodiment of the grain cart 10.

The grain cart 10 and control system 50 of this invention therefore provides several technical advantages over the known designs. For example, the operator is prevented from inadvertently moving the upper auger conveyor section 16 from the unload position towards the storage position when the auger feed gate 40 is open. Consequently, the upper auger conveyor section 16 may not separate from the lower auger conveyor section 22, which would otherwise cause grain to spill out of the lower auger conveyor section 22 at the hinge assembly 32. Instead, the operator is forced to close the auger feed gate 40 before the moving the upper auger conveyor section 16 from the unload position towards the storage position. Advantageously, in the time it takes to close the auger feed gate 40, the auger can finish clearing out any remaining grain in the discharge conveyor 14. Cleaning out the discharge conveyor 14 makes the upper auger conveyor section 16 lighter and protects it from being damaged when it moves from the unload position towards the storage position.

The disclosed system and method for controlling the operation of the discharge conveyor 14 offers benefits over other systems that rely upon more complex ways to lock out the discharge conveyor 14 from folding. For example, some systems monitor the speed of the rotating auger to enable a lock out condition. Other systems monitor the weight of the auger housing to enable a lock out condition. Still other systems monitor both the speed of the rotating auger and the weight of the auger housing to enable a lock out condition. The disclosed system and method are much less complex, less costly to implement, and more reliable in operation than these other lock out systems. Furthermore, the system and method of the present invention provides more feedback to the operator of the grain cart than these prior designs regarding the auger feed gate, which cannot be seen from outside the grain cart.

While the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A grain cart comprising:
   a grain hopper;
   a discharge conveyor extending into the grain hopper and having a lower auger conveyor section and an upper auger conveyor section pivotally movable relative to the lower auger conveyor section between a first position in which the upper auger conveyor section is disengaged from the lower auger conveyor section and a second position in which the upper auger conveyor section is aligned with and engaged with the lower auger conveyor section, the lower auger conveyor section further including an auger feed gate movable between a closed position and an open position;
   a movement actuator adapted to move the upper auger conveyor section between the first position and the second position; and
   a control system including an auger feed gate position sensor operatively coupled to the movement actuator and functioning to control the movement actuator based on input from the auger feed gate position sensor so as to provide a lock out function that prevents the movement actuator from moving the upper auger conveyor section towards the first position only when the auger feed gate is in the open position.

2. The grain cart of claim 1, further comprising an indicator rod connected to the auger feed gate and extending out of the grain hopper such that a tip end of the indicator rod is visible to an operator outside the grain cart, wherein the indicator rod is connected so as to move with the auger feed gate and thereby provide a visual indication of the position of the auger feed gate based on where the tip end is located.

3. The grain cart of claim 2, wherein the indicator rod carries at least one element configured to operatively interact with the auger feed gate position sensor such that the auger feed gate position sensor can determine when the auger feed gate is in the closed position or the open position.

4. The grain cart of claim 3, wherein the auger feed gate position sensor is a normally-closed push-button switch, and the at least one element carried by the indicator rod includes a switch trigger configured to engage the push-button switch to open the push-button switch when the indicator rod and the auger feed gate are moved to the closed position.

5. The grain cart of claim 4, wherein the switch trigger is slideably mounted on the indicator rod and is biased towards the push-button switch by a compression spring extending between the switch trigger and a clamp rigidly coupled for movement with the indicator rod.

6. The grain cart of claim 2, wherein the control system includes a control valve, the control valve includes a solenoid operatively connected to the auger feed gate position sensor, the solenoid configured to be energized when the auger feed gate is in the open position.

7. The grain cart of claim 6, wherein the control valve has a two-way channel and a check valve, the two-way channel being operative when the auger feed gate is in the closed position and the check valve being operative when the auger feed gate is in the open position based on selective energizing of the solenoid.

8. The grain cart of claim 7, wherein the movement actuator is a hydraulic cylinder, and the check valve of the control valve prevents outgoing flow from one side of the hydraulic cylinder when the auger feed gate is in the open position, thereby preventing movement of the hydraulic cylinder in one direction corresponding to movement of the upper auger conveyor section towards the first position.

9. The grain cart of claim 1, wherein the first position is a storage position of the discharge conveyor and the second position is an unload position of the discharge conveyor.

10. The grain cart of claim 1, further comprising a visual indicator in the form of a light-emitting diode that is actuated when the auger feed gate position sensor determines that the auger feed gate is in the open position to provide a visual indication to an operator outside the grain cart when the lock out function is operating to prevent movement of the upper auger conveyor section towards the first position.

11. The grain cart of claim 10, further comprising an indicator rod connected to the auger feed gate and extending out of the grain hopper such that a tip end of the indicator rod is visible to an operator outside the grain cart, wherein the tip end provides another visual indication of the position of the auger feed gate based on where the tip end is located, such that the grain cart provides multiple visual indications of when the lock out function is active.

12. The grain cart of claim 1, wherein the lock out function of the control system does not prevent the movement actuator from moving the upper auger conveyor section towards the second position when the auger feed gate is in the open position, and the movement actuator is free to move the upper auger conveyor section in either direction when the auger feed gate is in the closed position and the lock out function is not active.

13. The grain cart of claim 1, wherein the upper and lower auger conveyor sections include an auger therein for moving grain through the discharge conveyor, and the lock out function is used to assure the auger runs to clear the discharge conveyor from grain before the upper auger conveyor section is moved from the second position towards the first position.

14. The grain cart of claim 13, wherein the auger feed gate position sensor is also operatively coupled to an actuator for the auger such that the auger cannot initiate rotation unless the auger feed gate is in the closed position, to thereby avoid damaging the auger and/or the actuator by starting rotation while under load from grain entering through the auger feed gate from the grain hopper.

15. A method for controlling a grain cart including a grain hopper and a discharge conveyor with an upper auger conveyor section and a lower auger conveyor section pivotally movable relative to one another, the method comprising:

moving, by a movement actuator, the upper auger conveyor section from a first position in which the upper auger conveyor section is disengage from the lower auger conveyor section to a second position in which the upper auger conveyor section is aligned with and engaged with the lower auger conveyor section;

operating an auger located in the upper and lower auger conveyor sections while the upper auger conveyor section is in the second position to transport grain from the grain hopper through the discharge conveyor;

moving an auger feed gate located at the lower auger conveyor section between an open position and a closed position, to thereby control flow of grain from the grain hopper into the discharge conveyor;

sensing, by an auger feed gate position sensor, whether the auger feed gate is in the open position or the closed position; and disabling with a lock out function the movement actuator from moving the upper auger conveyor section towards the first position only when the auger feed gate is in the open position, as determined by the auger feed gate position sensor.

16. The method of claim 15, wherein the movement actuator is a hydraulic cylinder, and the step of disabling with a lock out function further comprises:

actuating a solenoid to selectively prevent outgoing flow from one side of the hydraulic cylinder when the auger feed gate is in the open position.

17. The method of claim 16, wherein the auger feed gate position sensor is connected to the solenoid within a control valve, the control valve includes a two-way channel and a check valve, and the step of actuating the solenoid further comprises:

placing, by the solenoid, the two-way channel into communication with the hydraulic cylinder to allow flow in both directions and thereby allow the movement actuator to move the upper auger conveyor section in either direction when the auger feed gate position sensor determines that the auger feed gate is in the closed position; and placing, by the solenoid, the check valve into communication with the hydraulic cylinder to allow flow in only one direction and thereby allow the movement actuator to move the upper auger conveyor section only towards the second position when the auger feed gate position sensor determines that the auger feed gate is in the open position.

18. The method of claim 15, wherein the auger feed gate position sensor is a normally-closed push-button switch, the grain cart further includes an indicator rod connected to the auger feed gate such that a tip end of the indicator rod is visible to an operator outside the grain cart, the indicator rod carries a switch trigger, and the method further comprises:

moving the indicator rod with movements of the auger feed gate such that the tip end extends further out of the grain hopper when the auger feed gate moves to the open position, thereby providing a visual indication of the position of the auger feed gate to the operator; and moving, by the indicator rod, the switch trigger into engagement with the push-button switch to deactivate the lock out function when the auger feed gate moves to the closed position.

19. The method of claim 15, wherein the grain cart further includes a visual indicator in the form of a light-emitting diode that is visible to an operator outside the grain cart and is operatively connected to the auger feed gate position sensor, and the method further comprises:

actuating the light-emitting diode to provide a visual indication to the operator when the lock out function is active according to signals from the auger feed gate position sensor.

20. The method of claim 15, wherein the lock out function does not prevent the movement actuator from moving the upper auger conveyor section towards the second position when the auger feed gate is in the open position, and the movement actuator is free to move the upper auger conveyor section in either direction when the auger feed gate is in the closed position and the lock out function is not active.

21. The method of claim 15, further comprising:
preventing a start of rotation of the auger when the auger feed gate is in the open position, to thereby avoid damaging the auger and/or the actuator by starting rotation while under load from grain entering through the auger feed gate from the grain hopper.

\* \* \* \* \*